(12) United States Patent
Malcolm

(10) Patent No.: US 6,715,037 B2
(45) Date of Patent: *Mar. 30, 2004

(54) MULTIPLE CACHE COMMUNICATION AND UNCACHEABLE OBJECTS

(75) Inventor: Michael A. Malcolm, Los Altos, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 62 days.

This patent is subject to a terminal disclaimer.

(21) Appl. No.: 10/206,388

(22) Filed: Jul. 26, 2002

(65) Prior Publication Data

US 2003/0023813 A1 Jan. 30, 2003

Related U.S. Application Data

(63) Continuation of application No. 09/127,249, filed on Jul. 31, 1998, now Pat. No. 6,427,187.

(51) Int. Cl.[7] ............................................. G06F 12/00
(52) U.S. Cl. .................. 711/119; 711/124; 707/10; 709/218; 709/219; 709/232; 709/252
(58) Field of Search .................... 709/252, 216, 709/247, 232, 237, 218, 206, 228, 223, 203; 707/6, 101, 10, 3; 712/26, 207; 711/127, 119, 157, 137

(56) References Cited

U.S. PATENT DOCUMENTS

| | | | |
|---|---|---|---|
| 5,649,154 A | 7/1997 | Kumar et al. | |
| 5,696,932 A | * 12/1997 | Smith | 711/118 |
| 5,787,470 A | 7/1998 | DeSimone et al. | |
| 5,878,218 A | 3/1999 | Maddalozzo et al. | |
| 5,933,849 A | 8/1999 | Srbljic et al. | |
| 6,061,715 A | * 5/2000 | Hawes | 709/203 |
| 6,094,662 A | * 7/2000 | Hawes | 707/104.1 |
| 6,289,358 B1 | * 9/2001 | Mattis et al. | 707/203 |
| 6,427,187 B2 | * 7/2002 | Malcolm | 711/119 |
| 2001/0000083 A1 | 3/2001 | Crow et al. | |
| 2002/0002660 A1 | 1/2002 | Malcolm | |
| 2002/0004917 A1 | 1/2002 | Malcolm et al. | |

OTHER PUBLICATIONS

Baentsch et al. "World Wide Web Caching: The Application-Level View of the Internet". IEEE Communications Magazine, Jun., 1997, pp. 170–178.
CacheFlow, Inc. "High Performance Web Caching White Paper". CacheFlow, Inc. 1998.
Danzig. "NetCache Architecture and Deployment". Network Appliance, Inc., Santa Clara, CA. 1998.
Microsoft Corporation. "Microsoft Proxy Server Version 2.0 Reviewer Guide". 1997, pp. 1–74.

* cited by examiner

Primary Examiner—Matthew Kim
Assistant Examiner—Matthew D. Anderson
(74) Attorney, Agent, or Firm—Swernofsky Law Group PC

(57) ABSTRACT

A method and system for operating multiple communicating caches. Between caches, unnecessary transmission of repeated information is reduced. Pairs of communicating caches compress transmitted information, including non-cacheable objects. A first cache refrains from unnecessarily transmitting the same information to a second cache when each already has a copy. This includes both maintaining a record at a first cache of information likely to be stored at a second cache, and transmitting a relatively short identifier for that information in place of the information itself. Caches are disposed in a graph structure, including a set of root caches and a set of leaf caches. Both root and leaf caches maintain noncacheable objects beyond their initial use, along with a digest of the non-cacheable objects. When a server devices returns identical information to a root cache, root caches can transmit only a digest to leaf caches, avoiding re-transmitting the entire noncacheable object.

21 Claims, 2 Drawing Sheets

MULTIPLE CACHE COMMUNICATION AND UNCACHEABLE OBJECTS

This application is a continuation of application Ser. No. 09/127,249, filed Jul. 31, 1998, now U.S. Pat. No. 6,427,187 (now allowed).

This application is a continuation of application Ser. No. 09/127,249 filed Jul. 31, 1998, and of PCT application Ser. No. PCT/US99/17149 filed Jul. 28, 1999, hereby incorporated by reference.

BACKGROUND OF THE INVENTION

1. Field of Invention

The invention relates to caches.

2. Related Art

In a computer system in which client devices request information from one or more server devices, it is sometimes desirable to provide cache; that is, a device that maintains copies of requested information so multiple requests for the same information can be satisfied at the cache. When requests for information are satisfied at the cache, the server devices need not receive the requests, process them, and retransmit the same information over a communication channel that links the client devices and the server devices. For example, the server devices can be web servers, the client devices can be web clients, the communication channel can be an IP network such as the Internet, and the requested information can be web objects.

Some information requested from the server devices is considered not cacheable, for one or more of several reasons. As examples, the server can refuse to allow the information to be cached, or the information can be a result of a dynamic process that can provide differing results for the same request (so caching would obviate the operation of that dynamic process). An example of dynamically processed information could include advertisements, database searches, or output from CGI scripts.

However, it often occurs that non-cacheable information is requested a second time without having changed, so the second request to the server results in identical information being returned. In a system with multiple communicating caches, transmitting the same information from a first cache to a second cache (when each already has a copy) is an inefficient use of communication resources.

Accordingly, it would be desirable to provide a method and system for operating a set of multiple communicating caches, in which transmission of repeated information is substantially reduced or eliminated. A first aspect of the invention is to maintain information at each cache to improve the collective operation of multiple communicating caches. A second aspect of the invention is to substantially reduce the amount of information transmitted between multiple communicating caches. A third aspect of the invention is to refrain from unnecessarily transmitting the same data from a first cache to a second cache when the latter already has a copy.

SUMMARY OF THE INVENTION

The invention provides a method and system for operating a set of multiple communicating caches. Between caches, unnecessary transmission of repeated information is substantially reduced.

In a first aspect of the invention, each cache maintains information to improve the collective operation of the system of multiple communicating caches. This can include information about the likely contents of each other cache, or about the behavior of client devices or server devices coupled to other caches in the system.

In a second aspect of the invention, pairs of communicating caches substantially compress transmitted information. This includes both compression in which the receiving cache can reliably identify the compressed information in response to the message, and compression in which the receiving cache will sometimes be unable to identify the compressed information.

In a third aspect of the invention, a first cache refrains from unnecessarily transmitting the same information to a second cache when each already has a copy. This includes both maintaining a record at a first cache of information likely to be stored at a second cache, and transmitting a relatively short identifier for that information in place of the information itself.

In a preferred embodiment, a set of caches are disposed in a directed graph structure, with a set of root caches disposed for coupling to server devices and a set of leaf caches disposed for coupling to client devices. Both root caches and leaf caches store non-cacheable objects beyond their initial use, along with relatively short identifiers for the non-cacheable objects. When a server device returns identical information to a root cache in response to a request for a non-cacheable object, that root cache transmits only the identifier of the non-cacheable object to the requesting leaf cache, avoiding retransmitting the entire object if the leaf cache still has the object.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Inventions disclosed herein can be used in conjunction with inventions disclosed in one or more of the following patent applications:

- Provisional U.S. Application No. 60/048,986, filed Jun. 9, 1997, in the name of inventors Michael Malcolm and Robert Zarnke, titled "Network Object Cache Engine", assigned to CacheFlow, Inc., attorney docket number CASH-001 (P).
- U.S. application Ser. No. 08/959,058, filed Oct. 28, 1997, in the name of inventors Michael Malcolm and Ian Telford, titled "Adaptive Active Cache Refresh", assigned to CacheFlow, Inc., attorney docket number CASH-003.
- U.S. application Ser. No. 08/959,313, filed Oct. 28, 1997, in the name of inventors Doug Crow, Bert Bonkowski, Harold Czegledi, and Tim Jenks, titled "Shared Cache Parsing and Pre-fetch", assigned to CacheFlow, Inc., attorney docket number CASH-004.

U.S. application Ser. No. 09/093,533, filed Jun. 8, 1998, in the name of inventors Michael Malcolm and Robert Zarnke, titled "Network Object Cache Engine", assigned to CacheFlow, Inc., attorney docket number CASH-001.
and
PCT International Application PCT/US 98/11834, filed Jun. 9, 1997, in the name of assignee CacheFlow, Inc., and inventors Michael Malcolm and Robert Zarnke, titled "Network Object Cache Engine", attorney docket number CASH-001 PCT.

These applications are referred to herein as the "Cache Disclosures," and are hereby incorporated by reference as if fully set forth herein.

///

System Elements

Figure 1:
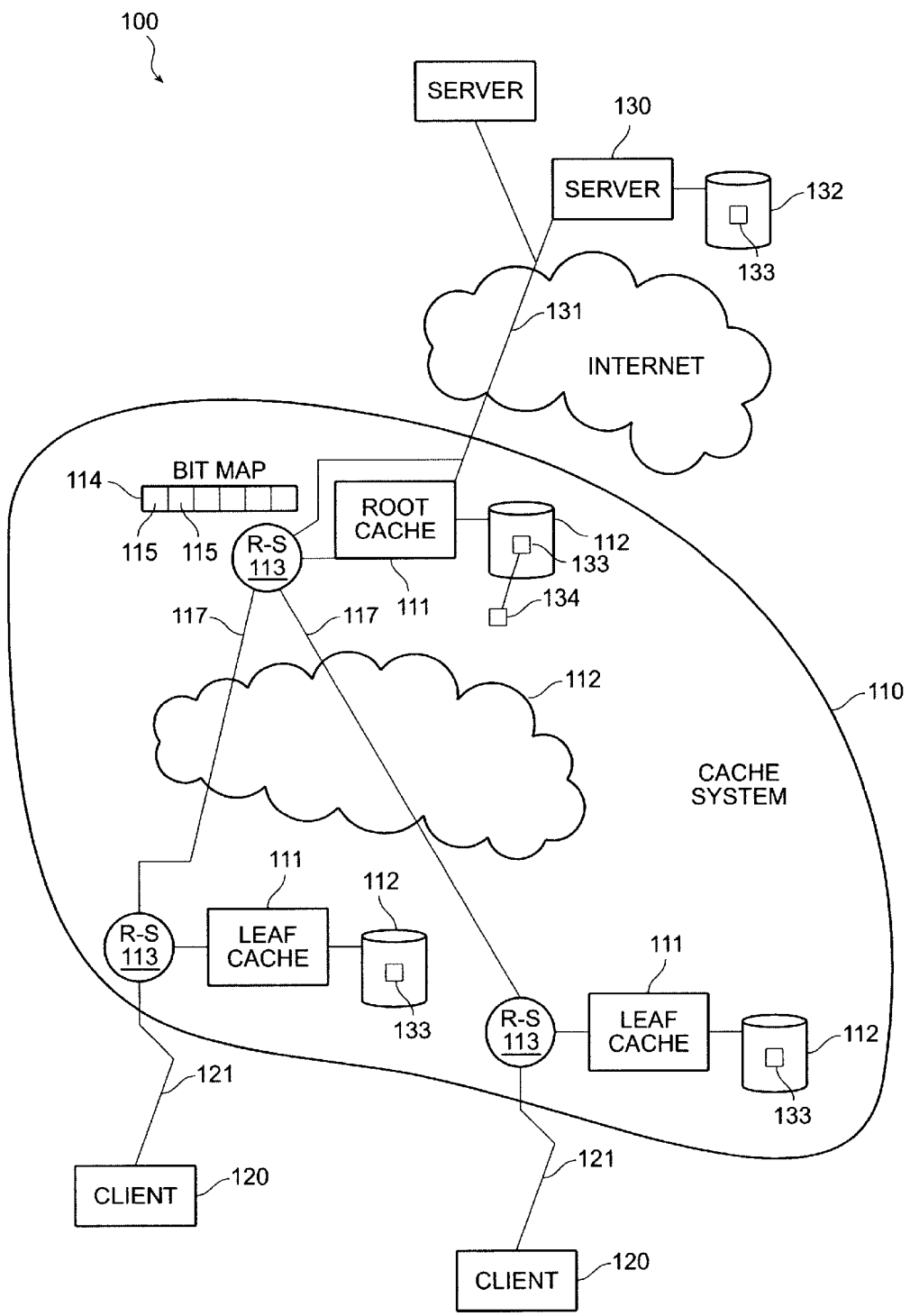
FIG. 1 shows a block diagram of a system having multiple caches.

FIG. 1 shows a block diagram of a system having multiple caches.

A system 100 includes a cache system 110, at least one client device 120, and at least one server device 130.

Client Device

Each client device 120 is coupled to the cache system 110 using a client communication path 121. The client communication path 121 can include a dial-up connection, a LAN (local area network), a WAN (wide area network), an ATM network, an IP network (such as an internet, intranet, or extranet), or some combination thereof. In a preferred embodiment, the client communication path 121 includes a dial-up connection, such as for coupling a subscriber to an ISP (internet service provider), or a LAN, such as for coupling a workstation to an internet connection.

As used herein, the terms "client" and "server" refer to relationships between the client or server and the cache, not necessarily to particular physical devices.

As used herein, the term "client device" includes any device taking on the role of a client in a client-server environment. There is no particular requirement that the client devices 120 must be individual devices; they can each be a single device, a set of cooperating devices, a portion of a device, or some combination thereof.

Server Device

Each server device 130 is also coupled to the cache system 110 using a server communication path 131. The server communication path 131 can include a dial-up connection, a LAN (local area network), a WAN (wide area network), an ATM network, an IP network (such as an internet, intranet, or extranet), or some combination thereof. In a preferred embodiment, the server communication path 131 includes an internet backbone and an internet connection between the cache system 110 and the internet backbone.

As used herein, the term "server device" includes any device taking on the role of a server in a client-server environment. There is no particular requirement that the server devices 130 must be individual devices; they can each be a single device, a set of cooperating devices, a portion of a device, or some combination thereof.

The server device 130 includes memory or storage 132 for recording one or more web objects 133. The web objects 133 can include any type of data suitable for transmitting to the client device 120, such as the following:

text, color, formatting and directions for display;
pictures, data in graphical formats (such as GIF or JPEG), other multimedia data;
animation, audio (such as streaming audio), movies, and video (such as streaming video), and other data in audio or visual formats (such as MPEG);
program fragments, including applets, Java, JavaScript, and ActiveX; and
other web documents (such as when using frames); and
other data types (such as indicated by future extensions to HTML, DHTML, SGML, XML, or similar languages).

///

Cache System

The cache system 110 includes a set of caches 111. The set of caches 111 comprises a variety of caches, preferably including root caches, leaf caches, intermediate caches and individual caches. Each cache 111 is designated a "leaf cache" if it is coupled to one or more client communication paths 121, and is designated a "root cache" if it is coupled to one or more server communication paths 131. The cache system 110 includes an inter-cache communication path 112 for communication between and among caches 111.

The inter-cache communication path 112 can include a plurality of direct connections, a LAN (local area network), a WAN (wide area network), an IP network (such as an internet), or some combination thereof. In a preferred embodiment, the inter-cache communication path 112 includes a plurality of direct connections between pairs of individual caches 111.

In a preferred embodiment, the caches 111 in the cache system 110 are disposed in a graph structure. One or more leaf caches 111 are coupled to client communication paths 121, and one or more root caches 111 coupled to one or more server communication paths 131. Where appropriate, a set of intermediate caches 111 are coupled to the leaf caches 111 and to the root caches 111.

In a preferred embodiment, the graph structure is a tree structure, with a single root cache 111 and a plurality of leaf caches 111. For example, in a cache system 110 disposed for use with an ISP (internet service provider), there is one root cache 111 coupled to an internet backbone, and there is one leaf cache 111 for each POP (point of presence). In this example, the inter-cache communication path 112 includes direct connections (such as T1 or T3 connections) between the root cache 111 and each leaf cache 111.

Cache Devices

Each cache 111 includes a processor, program and data memory, and memory or storage 114 for recording one or more web objects 133. Each cache 111 retains the web objects 133 for repeated serving to client devices 120 in response to web requests.

In a preferred embodiment, each cache 111 includes a router-switch 113, for receiving messages and distinguishing types of messages that should be processed by the cache 111 from those that should not. For example, the router-switch 113 can divert all requests using FTP (file transfer protocol) or HTTP (hypertext transfer protocol) to the cache 111 for processing, while passing through other types of requests unchanged.

In a preferred embodiment, each cache 111 includes a cache device such as described in the Cache Disclosures, hereby incorporated by reference as if fully set forth therein, and is disposed for operating as described therein.

Multiple Cache Communication

Each leaf cache 111 receives requests from client devices 120 for web objects 133. The web objects 133 might be cacheable or non-cacheable.

If a client device 120 requests a cacheable web object 133, the leaf cache 111 might already have the requested web object 133 in its memory or storage 114. If so, the leaf cache 111 serves the requested web object 133 to the client device 120 without having to request the web object 133 from the root cache 111 or from the server device 130. If the leaf cache 111 does not already have the requested web object 133, the leaf cache 111 requests it from the root cache 111.

The root cache 111 performs a similar caching function, returning the requested cacheable web object 133 directly to the leaf cache 111 if it is already present in its own memory or storage 114, without having to request that web object 133 from the server device 130. If the root cache 111 does not already have the requested web object 133 in its memory or storage 114, the root cache 111 requests it from the server device 130.

If the leaf cache 111 and the root cache 111 do not already have a copy of the web object 133 in their respective memory or storage 114, the root cache 111 requests the web object 133 from the server device 120. Similarly, if the web object 133 considered not cacheable, the root cache 111 requests the web object 133 from the server device 120 whether or not it has already that web object 133 in their respective memory or storage 114. The server device 130 receives the request and returns the requested web object 133 to the root cache 111.

Objects Already in Storage

The root cache 111 receives the requested web object 133 from the server device 130, records it in its memory or storage 114, and determines an object signature 134 for the web object 133. In a preferred embodiment, the root cache 111 computes the object signature 134 itself. In alternative embodiments, the server device 130 may compute and record the object signature 134 and transmit it to the root cache 111 with the web object 133.

In a preferred embodiment, the object signature 134 includes an MD5 digest of the web object 133. In alternative embodiments, the object signature 134 may comprise a CRC, MD4, SHA, or other known function of the web object 133.

There is no particular need for any device to be able to recover the web object 133 a priori from the object signature 134. It is sufficient that the root cache 111 or the leaf cache 111 can determine, in response to the object signature 134, if the web object 133 is present in its memory or storage 114, and if so, which web object 133 corresponds to that object signature 134.

If the web object 133 is cacheable but was requested from the server device 130, the request from the server device 130 was due to a cache miss. However, it can still occur that the leaf cache 111 (or some intermediate cache 111) already has the web objects 133 in its memory or storage 114, such as recorded in association with a different URL (uniform resource locator) or other identifier. In a preferred embodiment, each cache 111 records web objects 133 in association with the URL used to request those web objects 133.

For a first example, multiple server devices 130 can record mirror copies of identical web objects 133. For a second example, non-identical web objects 133 can include identical embedded web objects 133 (such as common graphics, animation, or program fragments).

If the web object 133 is considered non-cacheable, it was requested from the server device 130 because non-cacheable web objects 133 are not meant to be served from the cache 111. However, it can still occur that the leaf cache 111 (or some intermediate cache 111) already has the web objects 133 in its memory or storage 114, because the non-cacheable web object 133 had been requested earlier.

For a first example, if the web object 133 is responsive to a CGI script or database search, it can be identical to the results of an earlier response to that CGI script or database search. For a second example, if the web object 133 is determined dynamically by the server device 130 (such as randomly selected advertisements), it can be identical to an earlier advertisement transmitted by the server device 130.

The root cache 111 transmits the object signature 134 to the leaf cache 111. The leaf cache 111 determines, in response to the object signature 134, whether it already has the associated web object 133 in its memory or storage 114 and if so, which one is the associated web object 133. If so, the leaf cache 111 serves the associated web object 133 to the client device 120 from its memory or storage 114 without the root cache 111 having to actually transmit the entire web object 133. If not, the root cache 111 transmits the actual web object 133 to the leaf cache 111, which can then serve it to the client device 120.

In a preferred embodiment, the root cache 111 includes a bitmap 115 in its memory or storage 114 for each non-cacheable web object 133, including one bit 116 for each leaf cache 111. Each bit 116 of the bitmap 115 indicates whether its associated leaf cache 111 has a copy of the web object 133.

The root cache 111 directly transmits the actual web object 133 to the leaf cache 111 if the associated bit 116 of the bitmap 115 indicates that the leaf does not have the web object 133. If the bit 116 indicates that the leaf cache 111 does have the web object 133, the root cache 111 attempts to transmit only the object signature 134. However, even if the bit 116 indicates that the leaf cache 111 does have the web object 133, it may occur that the leaf cache 111, being a cache, has discarded the web object 133 in the interim. In this case, the leaf cache 111 so indicates and re-requests the web object 133 from the root cache 111.

In a preferred embodiment, when the root cache 111 transmits the object signature 134 to the leaf cache 111, it so indicates using a data type, such as a MIME type, or a new type of object, indicating that the transmission includes only the object signature 134.

Compression for Transmission

When transmitting actual web objects 133 between caches 111 (such as from the root cache 111 to the leaf cache 111), those web objects 133 are substantially compressed for transmission and decompressed after reception. Compression for transmission can be applied both to cacheable and to non-cacheable web objects 133.

Compression for transmission can include various techniques, such as Huffman coding, Liv-Zempel compression, or other known lossless compression. Compression for transmission can also include known lossy compression, such as JPEG, MPEG, or other audio and video codec techniques, when appropriate for the type of web object 133.

Those skilled in the art will recognize, after perusal of this application, that transmission of the object signature 134 in place of the actual web object 133 is a form of substantial compression. This form of compression is unreliable, in the computer science sense that the receiver is not guaranteed to be able to recover the web object 133 from its object signature 134. In fact, using this form of compression the leaf cache 111 can only do so if the web object 133 is already recorded in its memory or storage 114.

Unreliable Dictionary Compression

As used herein, "dictionary compression" means a form of communication in which a sender and a destination each maintain a set of dictionary elements and a set of associated tag values, each tag value being representative of one of the dictionary elements. There is no particular requirement that the dictionary elements can be recovered from their associated tag values without further information. Rather, dictionary compression refers generally to a system in which the dictionary elements can be associated with arbitrary tag values.

The sender and the destination each associate the same tag value with the same dictionary element. For example, the sender can transmit the dictionary element, along with an arbitrarily selected tag value, to the destination to make the association. Systems in which the sender does this, and the destination maintains a dictionary of such tag values in response thereto, are known in the art.

As used herein, "unreliable" dictionary compression means that the destination might possibly discard the association between the tag value and the dictionary element.

In a preferred embodiment, each dictionary element includes a complete web object 133, and the tag value associated with each particular web object 133 is a known function of that particular web object 133. The known function is preferably an MD5 signature, as noted herein.

In a preferred embodiment, the destination (because it is a cache) can discard any particular web object 133, and thus lose the association between that particular web object 133 and its MD5 signature. That is, the destination (because it has discarded the particular web object 133) can no longer determine if a particular MD5 signature is associated with any known web object 133. Moreover, the destination cannot determine the web object 133 in response to the MD5 signature without further information.

Transmission of the object signature 134 in place of the actual web object 133 is a form of dictionary compression in which the entire actual web object 133 is the dictionary element. If the leaf cache 111 has discarded that dictionary element, it requests the root cache 111 to retransmit the actual web object 133 using a second form of compression. For example, the second form of compression can include a known lossless compression technique such as Liv-Zempel compression or the form of compression used in the PKZIP product available from PKWare, Inc.

Those skilled in the art will recognize, after perusal of this application, that unreliable dictionary compression is applicable in various other applications that can use compression. In a preferred embodiment, unreliable compression is acceptable because the root cache 111 can retransmit the web object 133 using a more reliable (but possibly less strong) compression technique.

Other Web Object Information

The root caches 111 and the leaf caches 111 can also exchange other information about the web objects 133.

In a preferred embodiment, the cache system 110 collectively maintains information for each web object 133 regarding the following:

A probability the web object 133 in the cache system 110 will be next requested by some client device 120. This information will likely be best available at the leaf caches 111.

and

A probability the web object 133 in the cache system 110 will be stale. This information will likely be best available at the root caches 111.

The cache system 110 can collectively determine from this information whether the web object 133 is the next web object 133 recorded by the cache system 110 to be served state. As described in the Cache Disclosures, particularly attorney docket numbers CASH-003 and CASH-004, this information can be used to determine which web objects 133 to actively refresh.

Active refresh can also be applied to frequently-requested non-cacheable web objects 133, and distributed within the cache system 110, even though those web objects 133 are re-requested from the server devices 120 each time. Active refresh is well suited to web objects 133 such as advertisements, news reports, stock quotes, weather reports, and the like.

The cache system 110 can also maintain information about each web object 133 regarding at which cache 111 in the cache system 110 that web object 133 is recorded. With this information, the root cache 111 can request cached web objects 133 from one of the leaf caches 111, in addition to or instead of re-requesting the web objects 133 from server devices 120.

Method of Operation

Figure 2:
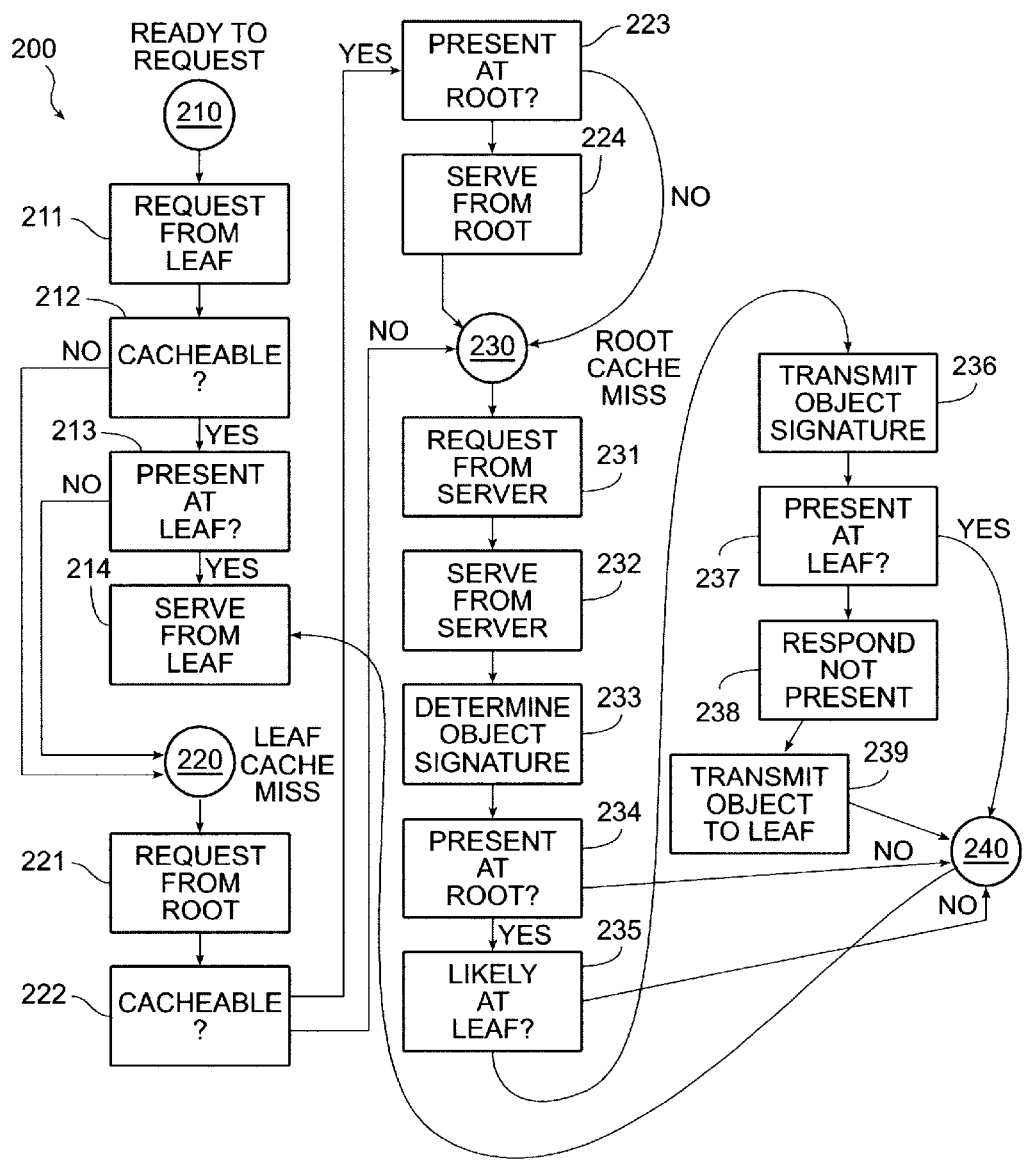
FIG. 2 shows a process flow diagram for a method of using a system having multiple caches.

FIG. 2 shows a process flow diagram for a method of using a system having multiple caches.

A method 200 is performed by the system 100, including the cache system 110, the client devices 120, and the server devices 130.

At a flow point 210, one of the client devices 120 is ready to request a web object 133.

At a step 211, one of the client devices 120 sends a message to its associated leaf cache 111 requesting a selected web object 133. The request message preferably uses the FTP or HTTP protocol, and includes a URL for the selected web object 133.

At a step 212, the leaf cache 111 determines if the web object 133 is cacheable or non-cacheable. If the web object 133 is cacheable, the method 200 proceeds with the next step. If the web object 133 is non-cacheable, the method 200 proceeds with the flow point 220.

At a step 213, the leaf cache 111 determines if the web object 133 is present in its memory or storage 114. In a preferred embodiment, the leaf cache 111 makes this determination in response to the URL for the selected web object 133 included in the request from the client device 120. If the web object 133 is present, the method 200 proceeds with the next step. If the web object 133 is not present, the method 200 proceeds with the flow point 220.

At a step 214, the leaf cache 111 serves the web object 133 to the client device 120. The method 200 continues with the flow point 210.

At a flow point 220, the leaf cache 111 is unable to serve the web object 133 from its memory or storage 114, either because there has been a leaf cache miss or because the web object 133 is non-cacheable.

At a step 221, similar to the step 211, the leaf cache 111 sends a message to the root cache 111 requesting the web object 133.

At a step 222, similar to the step 212, the root cache 111 determines if the web object 133 is cacheable or non-cacheable. If the web object 133 is cacheable, the method 200 proceeds with the next step. If the web object 133 is non-cacheable, the method 200 proceeds with the flow point 230.

At a step 223, similar to the step 213, the root cache 111 determines if the web object 133 is present in its memory or storage 114. In a preferred embodiment, the root cache 111 makes this determination in response to the URL for the selected web object 133 included in the request from the client device 120. If the web object 133 is present, the method 200 proceeds with the next step. If the web object 133 is not present, the method 200 proceeds with the flow point 230.

At a step 224, similar to the step 214, the root cache 111 transmits the web object 133 to the leaf cache 111. The method 200 continues with the flow point 210.

At a flow point 230, the root cache 111 is unable to transmit the web object 133 from its memory or storage 114, either because there has been a root cache miss or because the web object 133 is non-cacheable.

At a step 231, similar to the step 211, the root cache 111 sends a message to the indicated server device 130 requesting the web object 133. The request message preferably uses the FTP or HTTP protocol, and includes a URL for the selected web object 133.

At a step 232, the server device 130 transmits the web object 133 to the root cache 111.

At a step 233, the root cache 111 determines an object signature 134 for the web object 133.

At a step 234, the root cache 111 determines if the web object 133 is present in its memory or storage 114. In a preferred embodiment, the root cache 111 makes this determination in response to the object signature 134. If the web object 133 is present, the method 200 proceeds with the next step. If the web object 133 is not present, the method 200 proceeds with the flow point 240.

At a step 235, the root cache 111 determines if the web object 133 is likely present at the requesting leaf cache 111. In a preferred embodiment, the root cache 111 makes this determination in response to the bitmap 114 for the web object 133. If the web object 133 is likely present at the leaf cache 111, the method 200 proceeds with the next step. If the web object 133 is likely not present at the leaf cache 111, the method proceeds with the flow point 240.

At a step 236, the root cache 111 transmits the object signature 134 to the leaf cache 111.

At a step 237, the leaf cache 111 determines if the web object 133 is present in its memory or storage 114, in response to the object signature 134. If the web object 133 is not present, the method 200 proceeds with the next step. If the web object 133 is present, the method 200 proceeds with the flow point 240.

At a step 238, the leaf cache 111 transmits a message to the root cache 111 indicating that the web object 133 is not present.

At a step 239, the root cache 111 transmits the actual web object 133 to the leaf cache 111. As noted above, the actual web object 133 is compressed for transmission and decompressed upon reception.

At a flow point 240, the leaf cache 111 is ready to serve the web object 133 to the requesting client device 120. The method proceeds with the step 214.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A memory storing information including instructions, the instructions executable by a processor, the instructions including determining a first signature for an uncacheable object stored at a first cache, said uncacheable object having been requested by a client coupled to a network from a server coupled to said network, wherein said first cache is configured so as to be coupled to said network in a location that is remote from both said client and said server, and said uncacheable object is dynamically generated by said server in response to a URL;

sending said first signature from said first cache to a second cache;

comparing said first signature at said second cache with a second signature for said uncacheable object stored at said second cache; and sending said uncacheable object to said second cache only if said first signature and said second signature do not match.

2. A memory as in claim 1 wherein said second cache can only recover said uncacheable object from said second signature in response to a contents of said second memory associated with said second cache.

3. A memory as in claim 1, wherein said second cache can recover said uncacheable object from said second signature without further information.

4. A memory as in claim 1, wherein said instructions for determining said first signature include instructions for determining a known function of said object at said first cache;

said first signature includes a result of said known function;

said instructions for comparing include instructions for determining said known function of said uncacheable object at said second cache and comparing said first signature with a result of said known function of said uncacheable object.

5. A memory as in claim 4, wherein said known function is irreversible.

6. A memory storing information including instructions, the instructions executable by a processor, the instructions including determining, at a first cache, an object signature responsive to an uncacheable object, said uncacheable object having been requested by a client coupled to a network from a server coupled to said network, wherein said first cache is configured so as to be coupled to said network in a location that is remote from both said client and said server, and said uncacheable object is dynamically generated by said server in response to a URL;

sending said object signature to a second cache, wherein said second cache is configured so as to be coupled to said network in a location that is remote from both said client and said server;

comparing, at said second cache, said object signature with a function of at least one uncacheable object; and refraining from sending said uncacheable object in response to said steps for comparing only if said object signature does not match said function of said uncacheable object.

7. A memory as in claim 6, including instructions for coupling a result of said steps for comparing to said first cache; and coupling said uncacheable object to said second cache responsive to said comparison result.

8. A memory as in claim 6, including instructions for storing at said first cache information whether said uncacheable object is likely to be stored at said second cache;

wherein said steps for transmitting said object signature are responsive to said information.

9. A memory storing information including instructions, the instructions executable by a processor, the instructions including storing an uncacheable object at a first cache, said uncacheable object having been requested by a client coupled to a network from a server coupled to said network, wherein said first cache is configured so as to be coupled to said network in a location that is remote from both said client and said server, and said uncacheable object is dynamically generated by said server in response to a URL;

determining an object signature at said first cache in response to said uncacheable object;

sending said object signature to a second cache, wherein said second cache is configured so as to be coupled to said network in a location that is remote from both said client and said server;

comparing said object signature with a function of at least one uncacheable object stored at said second cache; and sending said uncacheable object to said second cache in response to said steps for comparing if said object signature does not match said function.

10. A memory as in claim 9, including instructions for storing at said first cache information whether said uncacheable object is likely to be stored at said second cache;

wherein said instructions for sending said object signature are responsive to said information.

11. A memory as in claim 9, including instructions for transmitting a result from performing said instructions for comparing to said first cache.

12. A memory storing information including instructions, the instructions executable by a processor, the instructions including storing, at a first cache, a first uncacheable object and first information including a date stamp that is used to ascertain the staleness of said first uncacheable object, said first uncacheable object having been requested by a client coupled to a network from a server coupled to said network, wherein said first cache is configured so as to be coupled to said network in a location that is remote from both said client and said server and said first uncacheable object is dynamically generated by said server in response to a URL;

storing, at a second cache, a second uncacheable object and second information including a date stamp that is used to ascertain the staleness of said second uncacheable object, wherein said second cache is configured so as to be coupled to said network in a location that is remote from both said client and said server and said second uncacheable object is dynamically generated by said server in response to a URL;

comparing said first information with said second information;

sending said first information to said second cache; and discarding said second uncacheable object if said first information does not match said second information.

13. A memory as in claim 12, including an instruction for sending said second information to said first cache; and discarding said first uncacheable object in response to said first information and in response to said second information.

14. A memory as in claim 12, wherein said first information includes a likelihood of said first uncacheable object being stored at said second cache.

15. A memory storing information including instructions, the instructions executable by a processor, the instructions including storing, at a first cache, an uncacheable object from a server and first information regarding the probability said uncacheable object will be stale, said uncacheable object having been requested by a client coupled to a network from said server coupled to said network, wherein said first cache is configured so as to be coupled to said network in a location that is remote from both said client and said server, and said uncacheable object is dynamically generated by said server in response to a URL;

storing, at a second cache, a second uncacheable object for delivery to a client and second information regarding the probability that said second uncacheable object will be requested by said client, wherein said second cache is configured so as to be coupled to said network in a location that is remote from both said client and said server;

sending said first information from said first cache to said second cache;

sending said second information from said second cache to said first cache, and comparing said first information with said second information; and determining whether to discard said uncacheable object from said first cache in response to a result of said comparing step;

wherein said first cache and said second cache operate together.

16. A memory storing information including instructions, the instructions executable by a processor, the instructions including providing a set of associations, at both a first cache and a second cache, such that each association in said set of associations includes a tag value and a dictionary element, wherein said set of associations concerns an uncacheable object having been requested by a client coupled to a network from a server coupled to said network, wherein said first cache and said second cache are configured so as to be coupled to said network in a location that is remote from both said client and said server and said uncacheable object is dynamically generated by said server in response to a URL;

comparing at least one of said set of associations from said first cache with at least one of said set of associations from said second cache;

discarding one or more of said set of associations at said second cache if one association included in said set of associations at said second cache matches one of said set of associations at said first cache; and sending from said first cache to said second cache said tag value or said dictionary element, in response to said steps for discarding, wherein said dictionary element and said tag value are associated with a web object.

17. A memory as in claim 16, including instructions for transmitting, from said destination to said source, an indication responsive to said instruction for possibly discarding;

wherein if said dictionary element is still present at said destination, said source does not need to transmit said dictionary element to said destination.

18. A memory storing information including instructions, the instructions executable by a processor, the instructions including sending a dictionary element from a source to a destination, said source and said destination being coupled to a communication link;

associating, at both said source and said destination, a first and second tag value with said dictionary element;

comparing said first tag value with said second tag value;

discarding said dictionary element at said destination if said first tag value for said dictionary element matches a second tag value for said dictionary element at said destination; and sending, from said source to said destination, said tag value or said dictionary element in response to said steps for discarding, wherein said dictionary element and said tag value concern an uncacheable object requested by a client coupled to a network from a server coupled to said network, wherein said source and said destination are configured so as to be coupled to said network in a location that is remote from both said client and said server and said uncacheable object is dynamically generated by said server in response to a URL.

19. A memory as in claim 18, including instructions for transmitting, from said destination to said source, an indication responsive to said steps for possible discarding;

wherein if said dictionary element is still present at said destination, said source does not deed to transmit said dictionary element to said destination.

20. A memory as in claim 18, wherein said set of dictionary elements each include an entire object deliverable from a first cache to a second cache.

21. A memory as in claim 18, wherein said set of dictionary elements includes at least one object larger than one kilobyte.

* * * * *